United States Patent [19]

Vitaloni

[11] Patent Number: 4,466,712
[45] Date of Patent: Aug. 21, 1984

[54] REAR VIEW MIRROR FOR MOTOR-VEHICLES

[75] Inventor: Alberto Vitaloni, Turin, Italy

[73] Assignee: Vitaloni S.p.A., Beinasco, Italy

[21] Appl. No.: 364,036

[22] Filed: Mar. 31, 1982

[30] Foreign Application Priority Data

Apr. 7, 1981 [IT] Italy ............................. 53115/81[U]

[51] Int. Cl.³ .......................... G02B 7/18; B60S 1/08; B60S 1/24
[52] U.S. Cl. .................................. 350/582; 350/289; 15/250.23; 15/250 B
[58] Field of Search ....................... 350/289, 582, 6.6; 15/250 B, 250.23, 250.29

[56] References Cited

U.S. PATENT DOCUMENTS

| | | | |
|---|---|---|---|
| 3,526,920 | 9/1970 | Boyanich | 15/250.29 |
| 3,968,537 | 7/1976 | Wagenhofer | 15/250 B |
| 4,050,776 | 9/1977 | Hsu | 350/289 |
| 4,190,326 | 2/1980 | Brodbeck | 350/289 |
| 4,339,169 | 7/1982 | Addison | 350/582 |

Primary Examiner—Jon W. Henry
Attorney, Agent, or Firm—Sughrue, Mion, Zinn, Macpeak, and Seas

[57] ABSTRACT

In an external rear view mirror, a drive mechanism is interposed between the body shell for supporting a mirror and the member for attaching the body shell to the body of a motor vehicle which allows a to-and-fro traversing movement of the body shell about a vertical axis. This traversing movement, which is controlled by a kinematic mechanism mounted within the body allows the reflecting surface of the mirror to scan the region behind the vehicle. A wiper mechanism is also provided for wiping the reflecting surface of the mirror. A single reversible electric motor is supported in the body shell for selective coupling to the drive mechanism or the wiper mechanism by respective clutches.

14 Claims, 4 Drawing Figures

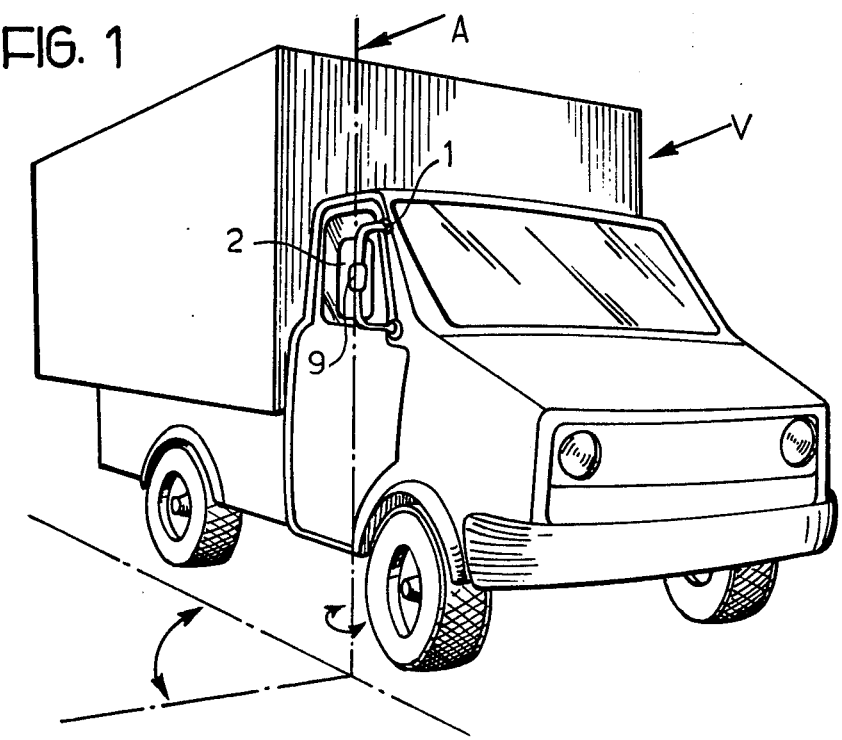
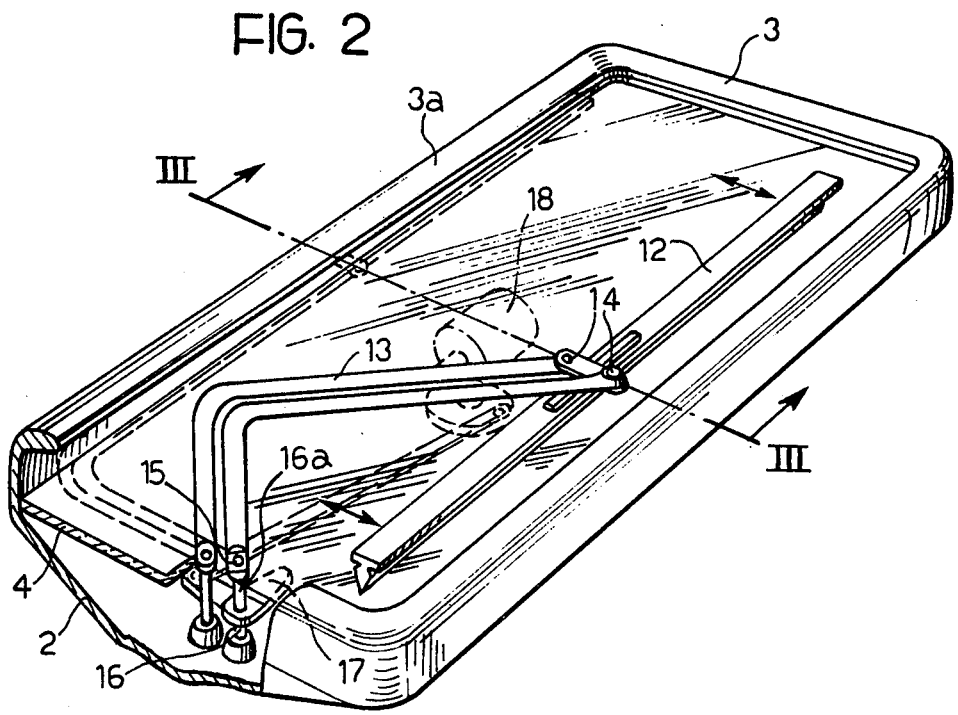

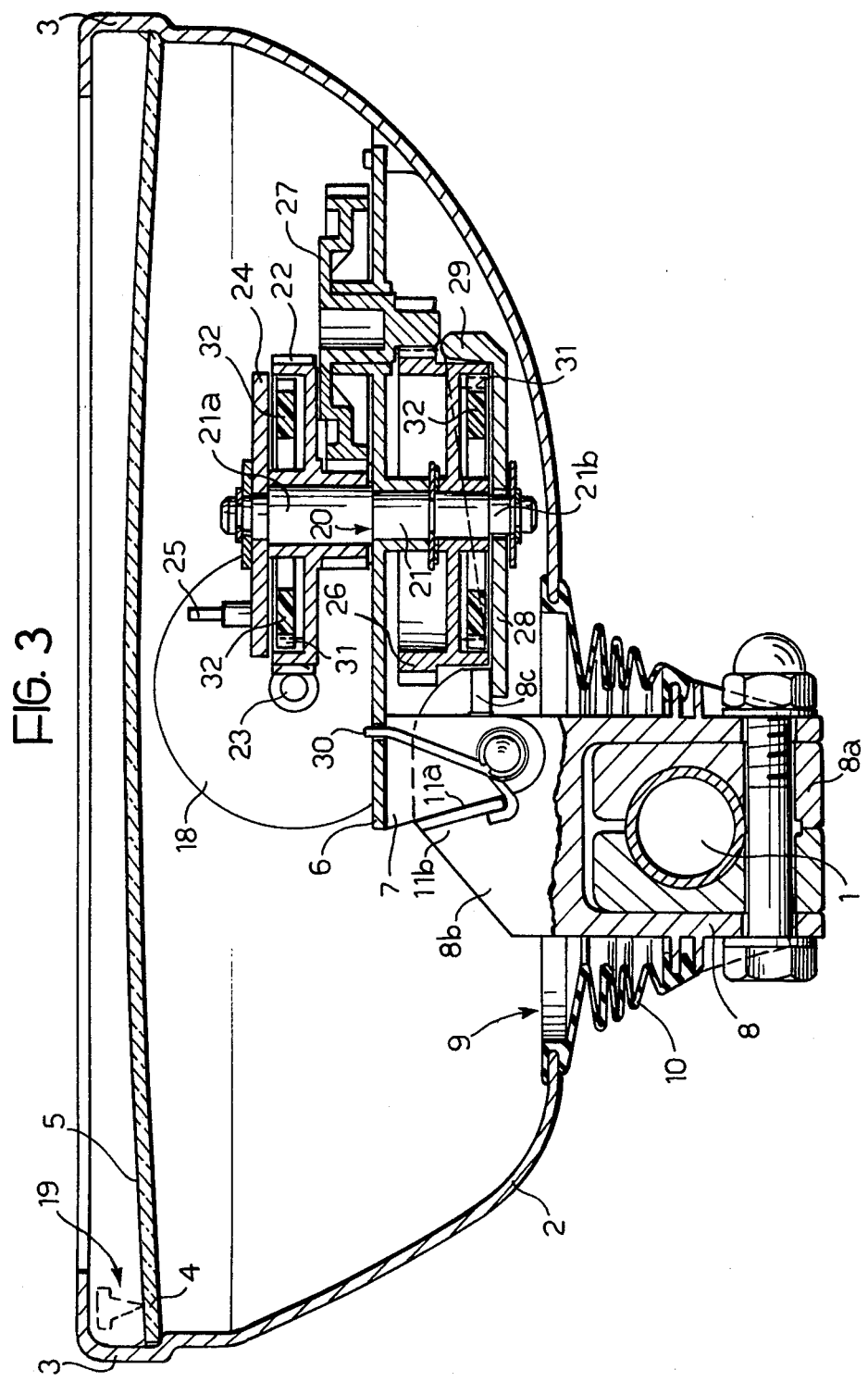

REAR VIEW MIRROR FOR MOTOR-VEHICLES

The present invention relates to external rear view mirrors for motor vehicles, comprising:
a member for attachment to the body of the motor vehicle,
a body shell carried by the attachment member and having a rim, and
a sheet fixed to the body within the rim and having a reflecting surface facing rearwardly of the body.

The external rear view mirror for motor vehicles, according to the invention is characterised by the fact that it includes:
articulation means interposed between the attachment member and the body, and operable to allow a to-and-fro traversing movement of the body and the sheet about an axis which, when the mirror is installed on the vehicle, is substantially vertical, and
means for controlling the traversing movement which include an electro-mechanical member and a kinematic mechanism.

The rear view mirror according to the invention is particularly advantageous for use on industrial vehicles in situations where the field of view framed by a normal rear view mirror does not provide the driver of the motor vehicle with sufficient visual information to drive safely.

For example, when the motor vehicle accelerates in a lane which leads at a very low angle of incidence into a road carrying a lot of traffic, the driver of the motor vehicle sees reflected in a normal rear view mirror only the portion of the road which has already been travelled, and cannot perceive in the rear view mirror motor vehicles which are overtaking along the road which he is about to join.

The traversing movement of the mirror according to the invention permits the driver of the motor vehicle to explore, in a horizontal sense, the space lying behind the motor vehicle without moving from his normal driving position.

Preferably, the rear view mirror according to the invention further includes:
wiper means operable to mechanically wipe the reflecting surface of the sheet, and
means for controlling the movement of the wiper means, which include an electro-mechanical member and a kinematic mechanism.

In a particularly advantageous embodiment, the rear view mirror according to the invention includes a single electric motor connected to serve as the electro-mechanical member for driving the kinematic linkage which controls the traversing movement of the body, and with the kinematic linkage which controls the movement of the wiper means.

The advantages deriving from the invention will become apparent from the following description with reference to the attached drawings, given purely by way of non-limitative example, and in which:

FIG. 1 is a perspective view of a motor vehicle on which a rear view mirror according to the invention is mounted;

FIG. 2 is a partially-sectioned perspective view of the mirror according to the invention;

FIG. 3 is a cross-section through the mirror taken on the line III—III of FIG. 2, in which various elements have been omitted for simplicity.

Figure 4:
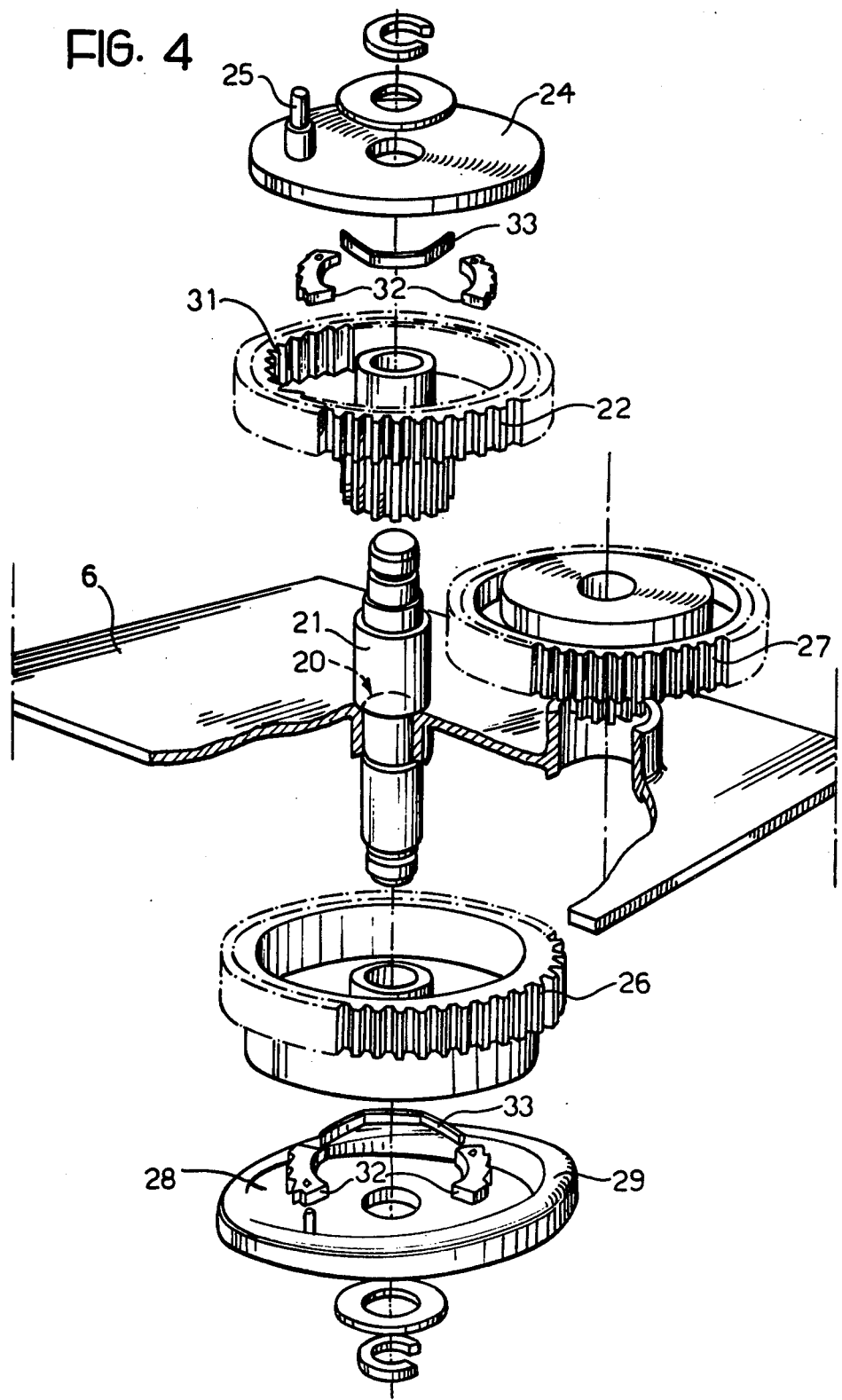
FIG. 4 is an exploded perspective view of various elements illustrated in FIG. 3.

In FIG. 1 there is indicated an attachment member 1 for attaching the mirror to the body of a motor vehicle V.

The mirror includes a body 2 in the form of a shell carried by the attachment member 1 and having a rim 3 within which is fixed a sheet 4 which has a reflecting surface 5 facing rearwardly of the body 2.

The body 2 is articulated to the attachment member 1 by means of a support 6 fixed within the body itself and which has a hinge 7 for connection to a stem 8, which is fixed at one end 8a of the stem and which projects into the body 2 through an aperture 9 which has a width such as to allow the traversing motion of the body 2 with respect to the stem 8.

The body 2 is joined to the stem 8 and to the attachment member 1 by means of a bellows sleeve 10. The hinge 7, interposed between the support 6 and the stem 8, defines an axis of rotation A which, when the mirror is installed on a vehicle, is substantially vertical as illustrated in FIG. 1. The support 6 and the stem 8 carry respective abutments 11a, 11b which are engageable with one another in an angular end-of-path position of the traversing movement of the body 2 and the sheet 4. This end-of-path position of the traversing movement corresponds to the normal positioning of the rear view mirror. As illustrated schematically in FIG. 1, the traversing movement corresponds to a rotation of the body 2 and the sheet 4 about the axis A defined by the hinge 7, which embraces the portion of the space lying behind the vehicle and to one side with respect to the path of movement of the vehicle.

The configuration of the articulation means described is such as to permit the utilisation of the mirror both on the drivers side and on the opposite side, or else on both sides of the motor vehicle in accordance with a mounting arrangement which is particularly advantageous in motor vehicles provided with a trailer. Such motor vehicles are frequently in conditions (for example, reversing on a curve) in which the end portion of the trailer is not in the field of view of a "normal" rear view mirror.

As illustrated in FIG. 2, the rear view mirror according to the invention is provided with means operable to mechanically clean the reflecting surface 5 of the sheet 4. Such means include a straight wiper blade 12 and an articulated parallelogram lever mechanism. This lever mechanism includes a pair of pivoting arms 13, substantially parallel to one another, each of which is connected at its ends to corresponding pivot points 14, 15 disposed respectively in a central position on the wiper blade 12 and on the rim 3.

A shaft 16 located in correspondence with one of the pivot points 15 is torsionally rigidly connected at one end 16a, which projects from the reflecting surface 5 of the sheet 4, to one of the pivoting arms 13. The shaft 16, which is orientated in a direction normal to the sheet 4, is connected by means of a linkage 17, situated within the body 2, with an electro-mechanical member 18 operable to impart to the wiper blade 12, by means of the shaft 16 and the pivoting arms 13, a reciprocating sweeping movement across the reflecting surface 5 of the sheet 4.

The rim 3 has a substantially rectangular form and each of the pivoting arms 13 has a cranked shape corresponding to that of the two contiguous sides 3a, 3b of the rim 3.

The arrangement is such that, at one of the ends of its path of movement, the wiper blade 12 extends along the side 3a of the rim, and the two arms 13 extend partly along the side 3a and partly along the side 3b. Preferably, the smaller side 3b is the top edge when the mirror is installed in position.

As can be seen better in FIG. 3, the rim 3 has an lip projecting over the reflecting surface 5 of the sheet 4 so as to form a channel housing 19 for receiving and concealing the pivoting arms 13 and the wiper blade 12 in their rest position.

The support 6, which is in the form of a plate, has a central hole 20 through which extends, in a direction normal to the surface of the plate 6, a spindle 21. On the end 21a of the spindle 21 which faces the plate 4 there is rotatably mounted a first toothed wheel 22 which meshes with a worm screw 23 driven to rotate by an electric motor 18 rigidly connected to the body 2.

Coaxial with the first wheel 22 and in a position facing the sheet 4, a first disc 24 is rotatably mounted about the pin 21; the rotation of the disc is controllable by the first wheel 22 and has an eccentric crank pin 25 connected to the linkage 17 (FIG. 2) for operation of the means for wiping the transparent surface 5 of the sheet 4.

At the end 21b of the spindle 21 opposite the sheet 4 there is rotatably mounted a second toothed wheel 26. This latter is driven to rotate by the first toothed wheel 22 by means of a reduction gear mechanism which includes a sprocket 27 which is rotatably supported by the plate 6.

Coaxial with the second wheel 26 opposite the sheet 4, and rotatable about the spindle 21, there is mounted a second disc 28 the rotation of which is controllable by the second toothed wheel 26. The second disc 28 has a projecting rim 29 of varying height cooperating in the form of a face cam with a projection 8c of the stem 8. The projecting rim 29 is biased into engagement with the projection 8c by resilient means 30 interposed adjacent the hinge 7 between the stem 8 and the plate 6 in such a way as to bias the body 2 towards the end-of-path position of the traversing movement.

The connection of each disc 24, 28 for rotation with a respective toothed wheel 22, 26 is regulated by clutches which can be of the electromagnetic type. In the embodiment illustrated, the electric motor 18 is reversible and the clutches are of the free wheel type. Such clutches are able to transmit the movement to one or the other of the discs 24, 28 in dependence on the direction of rotation of the motor 18. For this purpose, each of the clutches includes (FIGS. 3 and 4) an internal ring 31 of teeth of saw tooth form in the associated wheel 22, 26, and a pair of pawls 32 pivoted on the disc 24, 28 and biased into engagement with the ring 21 by resilient means 33 of the blade type.

Each pawl 32 has a plurality of teeth complementary in shape to those of the associated ring 31. The operation of the motor 8, and the corresponding actuation of the traversing and wiper means for the reflecting sheet 5 is controlled by an electric circuit (not illustrated) which includes means for allowing the selective operation of the motor in one or the other sense of rotation. There are also provided means for controlling the automatic return of the wiper means to the rest condition according to normal operating criteria for windscreen wipers.

The electric control circuit further includes means for allowing stopping of the traversing movement in an angular position selected by the driver of the motor vehicle, and means which act on the motor 18 to carry the body 2 and the sheet 4 to an angular end-of-path position of the traversing movement corresponding to normal orientation of the rear view mirror.

For this purpose the form coupling between the projecting edge 29 of the disc 28 serving as a face cam, and the projection 8c of the stem 8 is such as not to resist, in such end-of-path conditions, the biasing action of the resilient means 30. The arrangement of the means for controlling the traversing and the movement of the wiper means is such as to occupy a portion of reduced volume within the interior of the body 2.

Within the body 2 there can thus be housed other members, such as, for example, a reservoir for washing liquid and associated means for spraying this liquid onto the reflecting surface 5.

Naturally, the effects of the present model also extend to models which obtain equal utility by using the same inventive concept.

What is claimed is:

1. An external rear view mirror for motor vehicles comprising a body in the form of a shell having a rim, a sheet having a reflecting surface fixed to said body within the rim with the reflecting surface facing outwardly of the body, an attachment member for securing the body of the rear view mirror to a motor vehicle, a support fixed within said body, a stem fixed at one end to said attachment member with the opposite end of said stem projecting into the interior of the body through an opening in the body with the opening having a width permitting to and fro traversing movement of said body with respect to said stem, a pivot member interposed between said support and said opposite end of said stem to define a vertical articulation axis, a pair of abutments carried by said support and said stem, respectively, which are mutually engageable in an angular end-of-path position with respect to the traversing movement of said body, and a kinematic mechanism including a cam rotatably mounted on said support, a projection on said stem in engagement with said cam and resilient means interposed between said stem and said support acting in a direction to bias said body and said sheet to said end of path position of the traversing movement and to bias said cam into engagement with the projection upon said stem.

2. A rear view mirror as defined in claim 1 further comprising wiper means operable mechanically to wipe the reflecting surface of said sheet, a further kinematic mechanism for controlling the movement of said wiper means, a single electric motor, and clutch means for coupling said electric motor to either kinematic mechanism.

3. A rear view mirror as defined in claim 1 wherein the cam is a face cam comprising a rotatable disc with a projecting rim of varying height which cooperates with the projection of the stem.

4. A rear view mirror as defined in claim 2, wherein the support is constituted by a plate parallel to the reflecting sheet and having a spindle projecting normally from one of its faces, and wherein the kinematic traversing mechanism further includes:
 a worm screw rotatably driven by the electromechanical member;
 a toothed wheel rotatably mounted about the spindle and driven by the worm screw, and
 a disc mounted rotatably about the spindle, for rotation by the toothed wheel, and having a projecting rim of varying height serving as a cam which cooperates with the projection of the stem.

5. A rear view mirror as defined in claim 2, wherein said wiper means comprise:
- a straight wiper blade;
- an articulated parallelogram lever mechanism having a first pair of articulation points situated in a central position on the wiper blade, and a second pair of articulation points situated on the rim of the body, and a pair of substantially parallel pivoting arms each of which is connected at its ends to respective articulation points of said first and second pair, said lever mechanism being operable to allow the wiper blade to perform a reciprocating sweep movement over the reflecting surface of the sheet;
- a shaft located at one of the articulation points of said second pair in a direction normal to the surface of the sheet, said shaft being rigidly connected torsionally, at one end projecting from the reflecting surface of the sheet, to one of the pivoting arms, and
- a linkage connecting the shaft with said control means, for imparting to the pivoting arms of the parallelogram lever mechanism a reciprocating movement such as to produce the reciprocating movement of the wiper blade, said linkage being situated within the body.

6. A rear view mirror as defined in claim 2, wherein the rim has a substantially rectangular form; each of the pivoting arms has a cranked shape corresponding to that of two contiguous sides of the rim and is pivoted to the body adjacent one of the sides, and the arrangement is such that, at one of the ends of the path of movement which corresponds to a rest position of the wiper blade, said blade extends along the other contiguous side of the rim and the two arms extend along the two contiguous sides.

7. A rear view mirror as defined in claim 6, wherein the two arms are pivoted to the body and the wiper blade in respective median zones of the corresponding contiguous sides.

8. A rear view mirror as defined in claim 6, wherein the rim has a channel housing along at least one of said two contiguous sides for receiving and concealing the pivoting arms and the wiper blade in the said rest positions.

9. A rear view mirror as defined in any one of claims 6 to 8 and 2, wherein said further kinematic mechanism is constituted by a rotatable disc which has an eccentric crank pin cooperating with said linkage.

10. A rear view mirror as defined in claim 2, wherein said support is composed of a plate fixed in the body parallel to the reflecting sheet, and has a central hole and a spindle extending through the hole in a direction normal to the surface of the plate; said electric motor being rigidly connected to the body,
- a worm screw driven to rotate by the motor;
- a first toothed wheel, rotatably mounted at the end of the spindle facing the sheet, and meshing with the worm screw;
- a first disc rotatably mounted about the spindle coaxial with said first wheel and having an eccentric crank pin connected to said linkage;
- a second toothed wheel which is rotatably mounted about the spindle opposite the sheet;
- movement transmission means interposed between the said first wheel and said second toothed wheel and constituted by a reduction gear mechanism which includes at least one sprocket rotatably supported by the plate;
- a second disc rotatably mounted about the spindle coaxial with said toothed wheel in a position opposite to the sheet, said disc being rotatable by said second toothed wheel and having a projecting rim of varying height serving as a cam cooperating with a projection of the stem and,
- first and second clutches being interposed respectively between the first disc and the first wheel to drive the first disc, and between the second disc and the second wheel to drive the second disc.

11. A rear view mirror as defined in claim 10, wherein said clutches are of the electro-magnetic type.

12. A rear view mirror as defined in claim 10, wherein the electric motor is reversible and said clutches are of the free wheel type and are oriented in such a way as to transmit movement in opposite directions from one another.

13. A rear view mirror as defined in claim 12, wherein each of said clutches comprises a ring of internal teeth of sawtooth form on the associated toothed wheel, and at least one pawl pivoted on the disc and biased into engagement with the ring by resilient means.

14. A rear view mirror as defined in claim 13, wherein the pawl has a plurality of teeth complementary to those of the ring.

* * * * *